May 10, 1955     H. H. FALKMAN ET AL     2,707,979
ROTATABLE BARK-REMOVER CUTTERS AND KNIVES
Original Filed April 10, 1951     4 Sheets-Sheet 1

May 10, 1955 H. H. FALKMAN ET AL 2,707,979
ROTATABLE BARK-REMOVER CUTTERS AND KNIVES
Original Filed April 10, 1951 4 Sheets-Sheet 3

INVENTORS
Hans Hugo Falkman
Nial Torbjörn Karlén
Erik Magnus Olsson
BY Jarvis Marble
their Attorney

United States Patent Office 2,707,979
Patented May 10, 1955

2,707,979
ROTATABLE BARK-REMOVER CUTTERS AND KNIVES

Hans Hugo Falkman, Johanneshov, Nial Torbjörn Karlén, Stockholm, and Erik Magnus Olsson, Nacka, Sweden, assignors to Aktiebolaget Atlas Diesel, Nacka, Sweden, a corporation of Sweden Original application April 10, 1951, Serial No. 220,154. Divided and this application July 8, 1952, Serial No. 297,636

Claims priority, application Sweden April 11, 1950

6 Claims. (Cl. 144—208)

This application is a division of our copending application Serial No. 220,154, filed April 10, 1951.

The present invention relates to bark cutting machines comprising a rotatable cutter and the invention is particularly related to such bark cutting machines which are moved by hand along a log with the axis of rotation of the cutter disposed transversely to the longitudinal axis of the log. The invention also relates to cutters and knives for such bark cutting machines.

One object of the invention is to provide a bark cutting machine which has low weight and is of simple and rigid construction and in which ample space is provided for the passage of the chips produced during the cutting operation. A further object of the invention is to provide a cutting machine in which the cutter comprises any number of fixed knives with a shape producing a substantially V-shaped cut which within wide limits corresponds rather well to a portion of the periphery of logs of different diameters. A still further object of the invention is to provide simple, rigid and light cutters and knives for bark cutting machines which are simple in manufacture.

Figure 1:
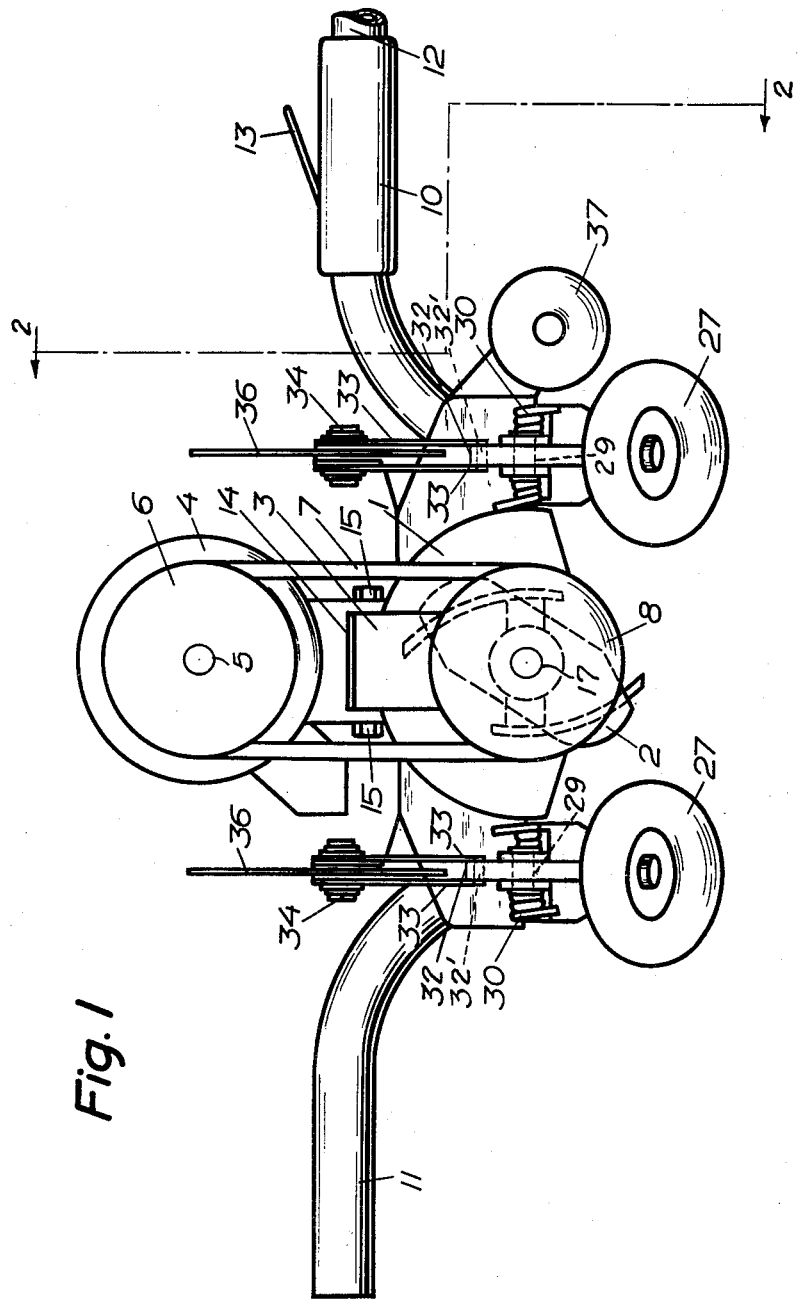
Figure 2:
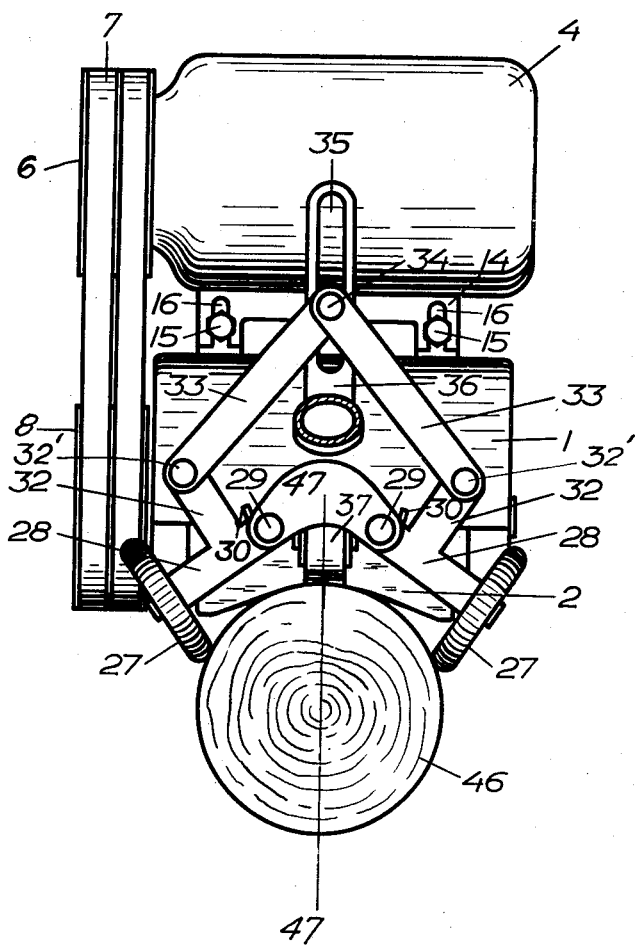
Figure 3:
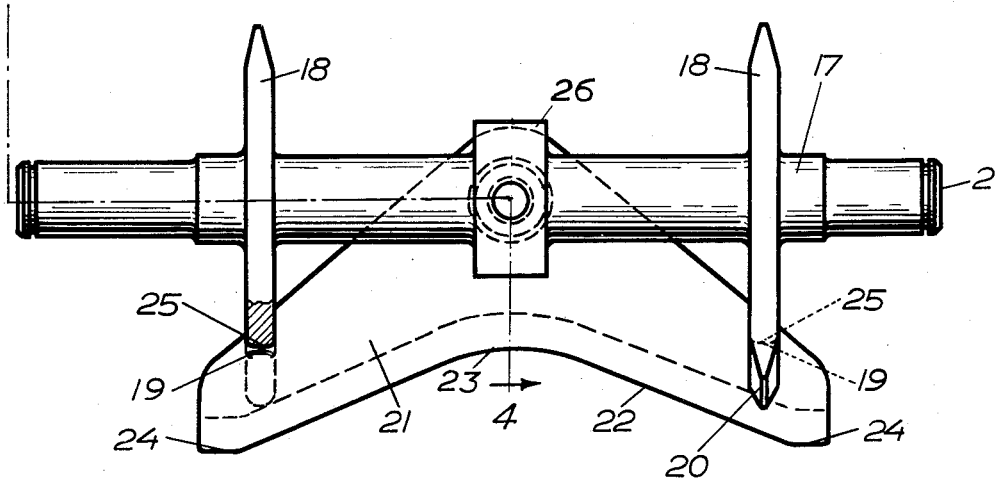
Figure 4:
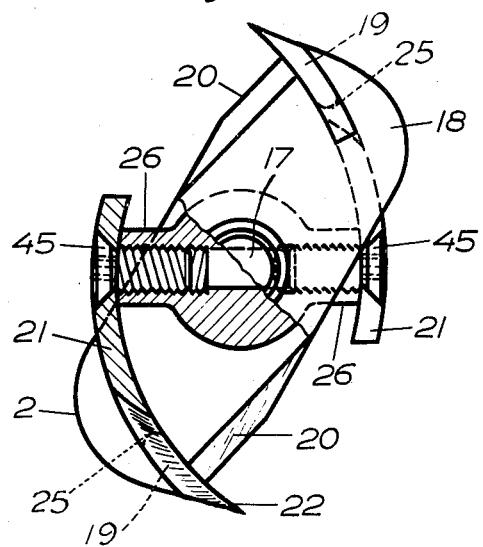
Figure 5:
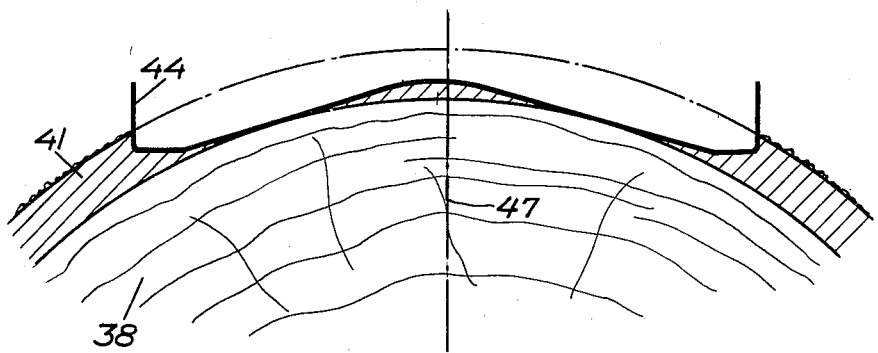
Figure 6:
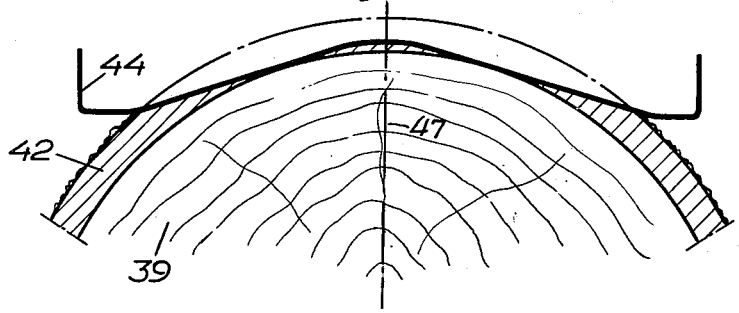
Figure 7:
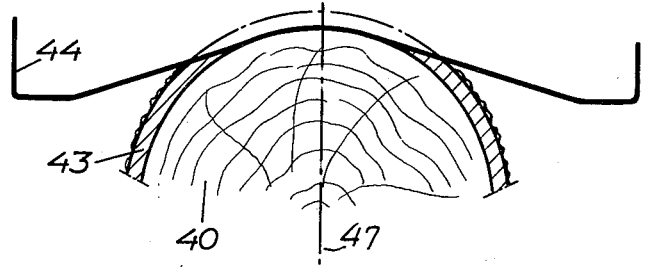

In the accompanying drawings one embodiment of a bark cutting machine according to the invention, a cutter for such a machine, and profiles produced by such a cutter upon operation on logs of three different diameters are illustrated by way of example, it being understood, however, that these showings are by no means limiting for the invention which may be varied in different ways within the scope of the claims. Fig. 1 is a side elevation of a bark cutting machine according to the invention, and Fig. 2 is an end elevation of said machine, partly in section, as indicated by the line 2—2 in Fig. 1. Fig. 3 is a fragmentary front elevation on a larger scale of a cutter for a machine according to Figs. 1 and 2, one knife only of said cutter being illustrated in the figure and one of the knife supports being broken away and shown partly in section. Fig. 4 is a composite end elevation and partial cross section of the cutter, as taken on the line 4—4 of Fig. 3, but includes the knife which was omitted in Fig. 3. Figs. 5, 6 and 7 illustrate in cross section cuts produced by the cutter according to Figs. 3 and 4 in the bark of logs of three different diameters.

The bark cutting machine according to Figs. 1 and 2 is a machine driven hand tool for operation longitudinally of a log with the axis of rotation of the cutter directed transversely to the longitudinal axis of the log. The machine consists of a frame or housing 1 in which a cutter generally designated by the reference numeral 2 is rotatably journalled. The housing 1 forms a bracket 3 for carrying a motor 4 which may be a compressed air driven motor, an internal combustion motor, an electric motor, or any other suitable motor. The shaft 5 of the motor 4 carries a pulley 6 for a V-belt 7 which drives a wheel 8 secured on a shaft 17 of the cutter 2. The V-belt drive is protected by a cover (not shown) which is carried by the housing 1. The housing covers and protects the cutter 2 and is provided with handles 10 and 11 disposed behind and in front of the cutter 2 when looking in the direction of feed of the machine. In the embodiment illustrated in Figs. 1 and 2 the motor 4 is a compressed air driven motor, and a supply conduit 12 for compressed air is carried through the handle 10 to the motor. For controlling the operation of the motor a main valve of conventional design and having an operating lever 13 is disposed in the handle 10. The motor 4 has a support 14 designed so as to permit adjustment of the tension of the V-belt 7, and for this purpose the support 14 has two lugs embracing the bracket 3 on the cutter housing 1. The support 14 is secured to the bracket 3 by means of screws 15 extending through elongated openings 16 in the lugs of the support 14 thereby permitting adjustment of the tension of the V-belt 7.

The cutter 2 provided in the bark cutting machine according to Figs. 1 and 2 comprises the shaft 17 forming the hub portion of the cutter, two transverse walls 18 which may be welded onto the shaft or secured to the shaft in any other way or made integral with the shaft, as indicated in Figs. 3 and 4, and two knives 21 carried by the transverse walls and the shaft. The transverse walls 18 are provided with slots 19 formed in the leading edge 20 of the walls, and in which slots the knives 21 are inserted. The knives 21 extend along the hub portion or shaft 17 of the cutter at such a distance that a large free area for the passage of the chips is provided between the knives and the hub portion. The knives 21 are formed by blanks of open V-shape cut out from tubular material, and the knives consequently form portions of cylinders, as is obvious from Fig. 4. The knives have an edge curve 22 which forms an open V preferably having about 140° angle between the shanks and rounded at the bottom of the V as indicated at 23. The curve 23 is formed so that the cut produced by the knife 21 fits the curvature of the smallest diameter of the log for which the cutter is intended. At the free ends of the shanks of the V the edge of the knife forms portions 24 substantially parallel to the axis of the cutter and extending substantially along a generatrix of the cylinder. Two slots 25 are provided in the trailing edge of each of the knives 21, the spacing of the slots corresponding to the distance between the two transverse walls 18 so that the slots 25 will register with the slots 19 of the transverse walls 18 to form joints which engage one another like two forks and thus lock the knives in the transverse walls against relative movement in two directions. Oppositely extending and interiorly threaded abutments 26 are formed centrally on the hub portion 17, and central portions of the trailing edges of the knives 21 are apertured to receive screws 45 which thread into the abutments and thus lock the knives 21 and the transverse walls 18 against relative movement in a third direction. The fastening points of the knives form a triangle, and a very efficient and simple fastening of the knives is obtained in this manner, and such fastening also simplies the exchange of knives. As obvious from Fig. 3 the edge curves 22 and 23, and the straight edge portions 24 of the knives 21 are made symmetrical relative to a plane perpendicular to the shaft 17 and containing the common axis of the threaded abutments 26.

In order to guide the bark cutting machine along the logs the machine is provided with guiding means comprising four supporting and guide wheels 27 journaled at the ends of transverse levers 28 swinging on trunnions 29 having springs 30 provided thereon which act to force the levers 28 with the guide wheels 27 against a log, for instance the log 46 indicated in cross section in Fig. 2. The levers 28 are provided with upwardly directed arms 32 pivotally connected by pins 32' to pairs of links 33 having common pins 34 guided in vertical slots 35 in plates 36 secured to the housing 1. The guiding of the pins 34 in the slots 35 results in forced guiding of the wheels 27 causing both wheels of each pair to take symmetric relative positions one on each side of the transverse plane of symmetry of the cutter 2. The bark cutting machine is furthermore provided with a supporting roller 37 journaled at the rear end of the machine and forming a nonyielding support on which the machine may be swung during operation in order to modify the depth of the cut which is obviously increased when the machine is pressed with increased force against the log by means of the handle 11.

Figs. 5–7 illustrate the profiles removed by the described cutter upon operation on logs of different diameters. The log 38 according to Fig. 5 has a diameter of about 10 inches, whereas the log 39 in Fig. 6 has a diameter of about 6 inches, and the log 40 in Fig. 7 a diameter of about 3 inches. In said figures, 41, 42 and 43, respectively, indicate the bark, the main part of which it is desired to remove. 44 indicates the curve or profile cut away by the cutter 2, and it is obvious from Figs. 5–7 that said curve corresponds sufficiently close to the curvature of logs of different diameters to cause a small portion only of the bark to be left remaining on the log.

The bark cutting machine above described and illustrated in the drawings operates in the following manner:

During barking the machine is placed with the axis of rotation of the cutter 2 directed transversely to the longitudinal axis of the log. A slight pressure towards the log is applied on the machine so that the roller 37 and the cutter 2 engage the log. The wheels 27 are then pressed symmetrically outwardly so that the machine rides on the log with the plane of symmetry of the cutter coinciding with the plane 47 containing the common axis of threaded abutments 26, 26 and the longitudinal axis of the log indicated in Figs. 2, 5, 6 and 7. Upon depression of the lever 13 compressed air is supplied to the motor 4 so that the motor rotates and the cutter starts to work. By using the roller 37 as a pivot or fulcrum the operator may control the depth of the cut by pressing the handle 11 more or less against the log. The weight of the machine and/or the pressure by means of which it is pressed against the log together with the guiding wheels 27 causes the plane of symmetry of the cutter automatically to substantially coincide with the plane 47 through the longitudinal axis of the log irrespective of the diameter of the log.

The invention also includes the special cutter and knives employed in the bark cutting machine according to the invention. Naturally, the cutters may comprise any number of knives, and the knives may be formed from substantially plane or other blanks. The knives may also be otherwise shaped than hereinabove described and illustrated on the drawings, and for operation on logs of larger dimensions, for instance, the angle between the shanks of the V-edge may vary up to about 180°. The guiding wheels 27 and the roller 37 may be replaced by suitable guiding surfaces or other guiding means on which the machine slides. Sometimes the guiding wheels may be dispensed with. The handle 11 may be replaced by a transverse handle.

What we claim is:

1. A bark cutting machine comprising a frame, a cutter mechanism rotatably journaled in said frame, a shaft in said cutter mechanism, knives forming parts of said cutter mechanism and fixed to said shaft and extending freely along the axis of rotation of said cutter mechanism at such a distance from said axis that a great free area for the passage of chips is provided between said knives and said shaft, and means for securing the knives in fixed relation to the shaft at three points of each knife disposed so as to form the corners of a triangle viewed when looking toward the axis of rotation of the cutter mechanism.

2. A bark cutting machine comprising a frame, a cutter mechanism rotatably journaled in said frame, a shaft having hub portions at both ends of said cutter mechanism, knives forming parts of said cutter mechanism and fixed to transverse walls on said hub portions and extending freely along the axis of rotation of said cutter mechanism at such a distance from said axis that a great free area for the passage of chips is provided between said knives and said shaft, said transverse walls on said hub portions having slots for receiving portions of said knives, and screw means between said walls for fixing a further portion of the knives to the shaft, said slots and screw means for each knife being disposed so as to form a V.

3. A bark cutter knife for rotary mounting in a bark cutting machine including a blade formed as a portion of a cylinder and having the shape of a V-shaped wing viewed when looking along a radius of said cylinder, said blade having a cutting edge formed along the inside of said V-shaped wing with an edge curve comprising a rounded central portion merging into substantially straight portions forming the shanks of the V which at their outer ends merge into portions extending substantially along a generatrix of the cylinder.

4. A bark cutting machine comprising a frame, a cutter mechanism rotatably journaled in said frame, a shaft forming a part of said cutter mechanism, at least two supports on said shaft projecting transversely of the shaft, knives fixed relative to said supports and extending freely along the shaft between the supports at such a distance from said shaft that a great free area for the passage of chips is provided between said knives and said shaft, each knife being formed as a portion of a cylinder and having the shape of a V-shaped wing fixed to said supports at the end portions of the wing.

5. A bark cutting machine comprising a frame, a cutter mechanism rotatably journaled in said frame, a shaft having hub portions at both ends of said cutter mechanism, knives forming parts of said cutter mechanism and fixed to transverse walls on said hub portions at such a distance from the axis of rotation of said cutter mechanism that a great free area for the passage of chips is provided between said knives and said shaft, said transverse walls on said hub portions having slots for receiving portions of the knives, and slots in said knives for receiving portions of said transverse walls to form an interlock between said knives and said transverse walls to keep the knives in fixed relation to the hub portions.

6. A bark cutter assembly comprising a cutter shaft formed for rotary mounting in a machine, at least three supports extending radially from said shaft and disposed so as to form the corners of a polygon viewed when looking toward one side of said shaft, and at least one knife in the cutter assembly secured to said supports in spaced relation to said shaft to provide a great free area for the passage of chips between the supports and between the shaft and said knife.

References Cited in the file of this patent

UNITED STATES PATENTS

| 1,893,016 | Brown | Jan. 3, 1933 |

FOREIGN PATENTS

| 38,655 | Sweden | Apr. 14, 1915 |
| 54,893 | Sweden | June 27, 1923 |
| 526,647 | Germany | June 8, 1931 |
| 908,030 | France | Aug. 6, 1945 |
| 117,415 | Sweden | Oct. 15, 1946 |